US009520927B2

(12) United States Patent
Nammi et al.

(10) Patent No.: US 9,520,927 B2
(45) Date of Patent: *Dec. 13, 2016

(54) INCLUDING FEEDBACK INFORMATION REGARDING AN INDIVIDUAL SUBBAND OF A WIRELESS CHANNEL

(71) Applicant: Apple Inc., Cupertino, CA (US)

(72) Inventors: Sairamesh Nammi, Richardson, TX (US); Shankar Venkatraman, Dallas, TX (US); Gaurav Hemrajani, Dallas, TX (US); Ashvin Chheda, Plano, TX (US); Lai King Tee, Dallas, TX (US); Neng Wang, Plano, TX (US); Kathiravetpillai Sivanesan, Richardson, TX (US)

(73) Assignee: Apple Inc., Cupertino, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 14/481,063

(22) Filed: Sep. 9, 2014

(65) Prior Publication Data

US 2014/0376497 A1    Dec. 25, 2014

Related U.S. Application Data

(63) Continuation of application No. 12/993,330, filed as application No. PCT/US2009/048629 on Jun. 25, 2009, now Pat. No. 9,178,594.

(Continued)

(51) Int. Cl.
*H04B 7/06*   (2006.01)
*H04W 4/20*   (2009.01)
(Continued)

(52) U.S. Cl.
CPC .......... *H04B 7/0619* (2013.01); *H04B 7/0417* (2013.01); *H04L 5/0096* (2013.01); *H04W 4/20* (2013.01); *H04B 7/063* (2013.01)

(58) Field of Classification Search
None
See application file for complete search history.

(56) References Cited

U.S. PATENT DOCUMENTS 7,599,698 B2   10/2009   Cheng et al.
7,826,415 B2   11/2010   Oh et al.
(Continued)

FOREIGN PATENT DOCUMENTS

EP   2068575 A1   6/2009
JP   2006211651 A   8/2006
(Continued)

OTHER PUBLICATIONS

Office Action from Japanese Application No. 2014-005486, issued Sep. 1, 2014, English and Japanese versions, pp. 1-12.
(Continued)

*Primary Examiner* — Candal Elpenord
(74) *Attorney, Agent, or Firm* — Meyertons, Hood, Kivlin, Kowert & Geotzel, P.C.

(57) ABSTRACT

To report feedback information regarding a wireless channel, a mobile station determines whether a predefined condition is satisfied. In response to determining that the predefined condition is satisfied, feedback information regarding an individual one of plural subbands of the wireless channel is included in a first report to be sent to a base station. In response to determining that the predefined condition is not satisfied, aggregate feedback information regarding the plural subbands is included in a second report to be sent to the base station.

20 Claims, 4 Drawing Sheets

Related U.S. Application Data

(60) Provisional application No. 61/075,667, filed on Jun. 25, 2008, provisional application No. 61/077,276, filed on Jul. 1, 2008.

(51) Int. Cl.
*H04B 7/04* (2006.01)
*H04L 5/00* (2006.01)

(56) References Cited

U.S. PATENT DOCUMENTS

| | | | |
|---|---|---|---|
| 8,284,731 B2 | 10/2012 | Shitara et al. | |
| 8,457,235 B2 | 6/2013 | Ko et al. | |
| 2002/0160798 A1 | 10/2002 | Shoji et al. | |
| 2006/0165188 A1 | 7/2006 | Wunder et al. | |
| 2007/0115796 A1 | 5/2007 | Jeong et al. | |
| 2007/0254597 A1* | 11/2007 | Li | H04B 7/0632 455/69 |
| 2008/0043677 A1 | 2/2008 | Kim | |
| 2008/0045228 A1 | 2/2008 | Zhang | |
| 2008/0188190 A1* | 8/2008 | Prasad | H04B 7/0617 455/114.3 |
| 2008/0285477 A1* | 11/2008 | Kuroda | H04L 1/0026 370/252 |
| 2009/0207784 A1 | 8/2009 | Lee, II et al. | |
| 2009/0262854 A1 | 10/2009 | Lee, II et al. | |

FOREIGN PATENT DOCUMENTS

| | | |
|---|---|---|
| JP | 2007068180 A | 3/2007 |
| JP | 2007110529 A | 4/2007 |
| JP | 2007-189349 | 7/2007 |
| KR | 1020070073508 | 7/2007 |
| KR | 20080015352 A | 2/2008 |
| WO | 2007037218 A1 | 4/2007 |
| WO | 2007092258 A1 | 8/2007 |
| WO | 2007094415 A1 | 8/2007 |
| WO | 2007110529 | 10/2007 |
| WO | 2008044529 A1 | 4/2008 |

OTHER PUBLICATIONS

Office Action from Japanese Application No. 2014-5487, issued Sep. 8, 2014, English and Japanese versions, pp. 1-7.
Office Action, Japanese Application No. 2015-36295, mailed Nov. 24, 2015, 5 pages.
Motorola, "Update of TS36.213 according to changes in cover sheet", 3GPP TSG-RAN WG1 Meeting 52 R1-081158, 3GPP, Feb. 11, 2008, Sorrento, Italy, 28 pages.
Office Action, Korean Application No. 10-2014-7006766, mailed Dec. 2, 2015, 10 pages.
Non-final Office Action, Korean Application No. 10-2011-7001955, mailed May 26, 2015, 7 pages.
Notice of Allowance, Japanese Application No. 2014-005486, mailed Jun. 11, 2015, 3 pages.
Notice of Allowance, Japanese Application No. 2014-005487, mailed Jun. 8, 2015, 3 pages.
U.S. Appl. No. 12/993,330, filed Nov. 18, 2010, Sairamesh Nammi.
Office Action from Japanese Patent Application No. 2011-516653, mailed Sep. 25, 2013, English Translation), pp. 1-4.
First Office Action, Search Report, and translation thereof, in Chinese Patent Application No. 200980124006.7, Feb. 18, 2013, pp. 1-11.
Chinese Patent Application No. 1902970 (A), Jan. 24, 2007, applicant Ericsson Telefon AB L M and inventors Cheng et al., entitled "Network controlled channel information reporting;" cited as US Counterpart, U.S. Pat. No. 7,599,698, above.
Chinese Patent Application No. 1363196 (A), Aug. 7, 2002, applicant Matsushita Electric Ind. Co. Ltd. and inventors Shoji et al., entitled "Mobile station apparatus, base station apparatus and method for allocating radio communication channels;" cited as US Counterpart, US 20020160798, above.
Office Action and translation thereof in Japanese Patent Application No. 2011-516653, Feb. 14, 2013, pp. 1-6.
Nortel, 3GPP TSG-RAN WG1#53bis R1-08xxx, Warsaw, Poland, Jun. 30-Jul. 4, 2008, Agenda Item: 6.3, CQI/PMI reporting on PUSCH, Discussion and Decision (6 pages).
Rohde & Schwarz, UMTS Long Term Evolution (L TE) Technology Introduction, Application Note 1 MA111, Mar. 2007 (32 pages).
3rd Generation Partnership Project;Technical Specification Group Radio Access Network; Evolved Universal Terrestrial Radio Access (E-UTRA); Physical layer procedures (Release 8) {77 pages).
Sivanesan et al., U.S. Appl. No. 12/919,840 entitled "Communicating a Feedback Data Structure Containing Information Identifying Coding to Be Applied on Wirelessly Communicated Signaling" filed Aug. 27, 2010 (28 pages).
Korean Intellectual Property Office, International Search Report for PCT/US2009/048629 dated Feb. 1, 2010 (4 pages).
Search Report, European Application No. 14188394.2, mailed Aug. 20, 2015, 7 pages.
Search Report, European Application No. 09771013.1, mailed Aug. 20, 2015, 6 pages.
Sharp, "Consideration on CQI reporting", 3GPP Meeting #48 Discussion, 3rd Generation Partnership Project, Mar. 26-30, 2007, 5 pages, St. Julians, Malta.
Huawei, "System level evaluation of CQI compression schemes for E-UTRA", 3GPP Meeting #49 Discussion, 3rd Generation Partnership Project, May 7-11, 2007, 8 pages, Kobe, Japan.
Office Action for Korean Patent Application No. 10-2016-7016920, Jul. 15, 2016, pp. 1-11.

* cited by examiner

INCLUDING FEEDBACK INFORMATION REGARDING AN INDIVIDUAL SUBBAND OF A WIRELESS CHANNEL

CROSS-REFERENCE TO RELATED APPLICATIONS

This application is a continuation of U.S. patent application Ser. No. 12/993,330, entitled "Including Feedback Information Regarding an Individual Subband of a Wireless Channel," filed Nov. 18, 2010, which is a National Phase Application under 35 USC 371 of PCT/US09/48629, filed Jun. 25, 2009, which claims the benefit of U.S. Provisional Patent Application Ser. No. 61/075,667, filed Jun. 25, 2008 and U.S. Provisional Patent Application Ser. No. 61/077, 276, filed Jul. 1, 2008, which are herein incorporated by reference in their entirety as though fully and completely set forth herein.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network.

In some cases, it may be desirable to provide feedback information regarding a wireless channel, where the feedback information can be sent from a mobile station to a base station. The feedback information can include information to allow the base station to apply a selected modulation and coding to data sent from the base station to the mobile station. In addition, the feedback information can include an indication of a quality of a wireless channel.

According to a conventional LTE standard, a wireless channel for communicating data is divided into subbands (also referred to as bands). A subset of subbands can be identified as optimal subbands that can be used for communication of data between the base station and the mobile station. The conventional LTE standard supports multiple modes of information feedback, but they may not be optimal. For example, PUSCH (physical uplink shared channel) reporting Mode 2-2 as defined by the LTE standard does not allow for feedback information regarding the wireless channel to be provided on an individual subband basis for the selected subbands, which can reduce flexibility and reduce the quality of data communications over the wireless channel.

SUMMARY

In general, according to a preferred embodiment, to report feedback information regarding a wireless channel, a mobile station determines whether a predefined condition is satisfied. If so, feedback information regarding an individual one of plural subbands of the wireless channel is included in a report to be sent to a base station. However, in response to determining that the predefined condition is not satisfied, aggregate feedback information regarding the plural subbands is included in another report to be sent to the base station.

Other or alternative features will become apparent from the following description, from the drawings, and from the claims.

DETAILED DESCRIPTION

Figure 1:
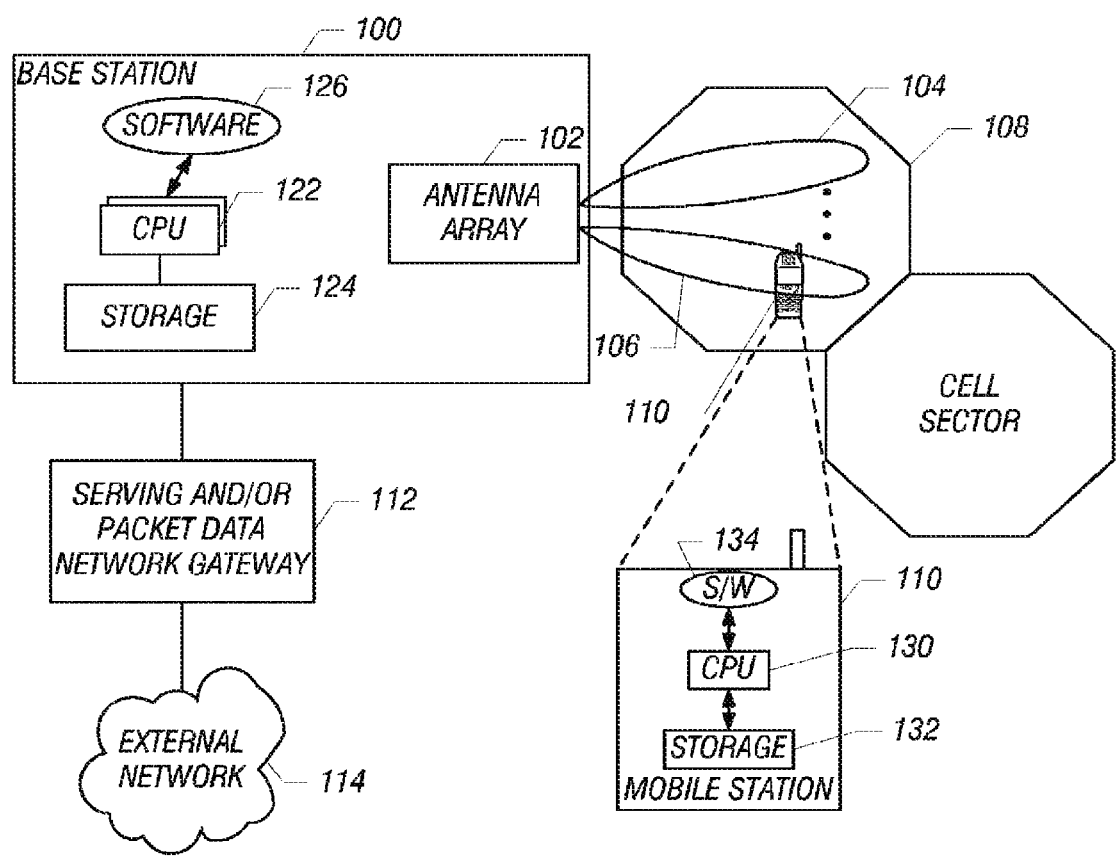
FIG. 1 is a block diagram of an exemplary arrangement that includes a wireless communications network that incorporates a preferred embodiment of the invention.

In the following description, numerous details are set forth to provide an understanding of some embodiments. However, it will be understood by those skilled in the art that some embodiments may be practiced without these details and that numerous variations or modifications from the described embodiments may be possible.

In accordance with some preferred embodiments, a technique or mechanism for reporting feedback information regarding a wireless channel is provided, in which feedback information regarding individual subbands can be provided to a base station. As used here, the term "wireless channel" refers to a collection of resources that can be used by wireless nodes, including mobile stations and base stations, to communicate wirelessly with each other. The resources include subcarriers of different frequencies. In addition, resources can include different time slots or different precoding vectors. In one embodiment, a wireless channel can be implemented according to an orthogonal frequency division multiplexing (OFDM) arrangement in which resources of the wireless channel are defined by combinations of time slots (along a time dimension) and subcarriers of different frequencies (along a frequency dimension).

In the OFDM arrangement, a subband (also referred to as "band") can include a number of subcarriers along the frequency dimension and all the OFDM symbols (time slots) along the time dimension. A wireless channel can thus be divided into multiple subbands. More generally, a "subband" refers to some predefined portion of a wireless channel, which can have multiple such predefined portions to use for communicating data between mobile stations and base stations.

The feedback information that can be provided from the mobile station to the base station includes feedback information to recommend modulation and coding to be applied by the base station on downlink signaling (traffic data and/or control signaling and/or reference signaling) transmitted by the base station to the mobile station. In this case, the feedback information includes an index (or other type of indicator) to enable selection of modulation and coding to be applied to signaling on the downlink. In some examples, this index includes a precoding matrix index (PMI) that can be used to apply precoding at the base station.

Another example of feedback information that can be sent from a mobile station to abase station includes a channel quality indicator (CQI), which is an indication of wireless channel quality.

In accordance with some embodiments, the type of feedback information that is reported from the mobile station back to the base station depends on whether a predefined condition is satisfied. In some implementations, this predefined condition is an indication of whether or not the mobile station is a stow moving (or stationary) mobile station or a fast moving (high velocity) mobile station. For a slow moving mobile station, it is likely that parameters of the feedback information do not change over several reporting periods, such that reporting the same parameters in corresponding reporting periods is redundant. For a slow moving mobile station, instead of repeatedly sending the same parameters in successive reporting periods, different feedback information can be sent in the different reporting periods. In other words, the reporting periodicity of different types of feedback information for different users can be set to different values.

In some reporting modes, the feedback information (including CQI and/or PMI) that is sent from the mobile station to the base station is an aggregate feedback information that reflects the properties of multiple subbands. The aggregate feedback information can be information that reflects an average or some other aggregate of properties of multiple subbands.

However, in accordance with some preferred embodiments, when the predefined condition is detected, instead of sending aggregate feedback information, individual feedback information for individual subbands can be reported (referred to as "incremental feedback reporting"). Thus, for example, instead of reporting an aggregate CQI for multiple subbands, an individual CQI for an individual subband can be reported. Similarly, instead of reporting an aggregate PMI that is based on aggregate properties of multiple subbands, an individual PMI can be reported for an individual subband.

From among a collection of subbands of a wireless channel, a subset of the subbands can be identified as being the preferred or "best" subbands of the wireless channel. For example, M (M>1) subbands can be identified. These M subbands can be used for communicating traffic data or higher-layer signaling information between a base station and a mobile station.

FIG. 1 shows an exemplary wireless network in which some embodiments of the invention can be provided. The wireless network includes a base station 100 that includes an antenna array or other assembly (multi-beam antenna) 102 for sending wireless signals along multiple paths 104, 106 (spatial beams) in a corresponding cell sector 108. In a different implementation, the antenna array 102 can include just a single antenna for sending wireless signals along one path.

A cell sector is one section of a cell of a cellular network. Although just two paths 104 and 106 are depicted in FIG. 1, it is noted that more than two paths (or just one path) can be provided in a cell sector in other embodiments. In alternative implementations, rather than providing multiple beams in a cell sector, it is noted that multiple beams can be provided in a cell. As used here, the term "cell segment" can refer to either a cell sector or a cell.

Although just one base station is depicted in FIG. 1, it is noted that a wireless network would typically include multiple base stations. In some embodiments, the wireless network is an LTE wireless network. In alternative embodiments, other types of wireless networks can be employed.

Note that reference to "LTE wireless network" refers to a wireless network that conforms to the requirements of the LTE standard developed by 3GPP, as that standard is modified or evolved over time, as well as to subsequent standards that evolve from LTE. Moreover, even though reference is made to LTE wireless networks in the ensuing discussion, it is noted that techniques according to preferred embodiments can also be applied to non-LTE, OFDM-based wireless networks.

In an LTE wireless network, the base station 100 includes an enhanced node B ("eNode B"), which includes a base transceiver station that includes the antenna array 102. The base station 100 may also includes a radio network controller that cooperates with the enhanced node B. The radio network controller and/or enhanced node B can perform one or more of the following tasks: radio resource management, mobility management for managing mobility of mobile stations, routing of traffic, and so forth. Note that one radio network controller can access multiple eNode Bs, or alternatively, an eNode B can be accessed by more than one radio access controller.

More generally, the term "base station" can refer to a cellular network base station, an access point used in any type of wireless network, or any type of wireless transmitter to communicate with mobile stations.

As depicted in FIG. 1, the base station 100 includes one or more central processing units (CPUs) 122, which is (are) connected to storage 124. Moreover, the base station 100 includes software 126 that is executable on the CPU(s) 122 to perform tasks of the base station 100, including tasks according to preferred embodiments to enable support for SDMA in the LTE wireless network.

The mobile station 110 of FIG. 1 also includes one or more CPUs 130 that are connected to storage 132. The mobile station 110 also includes software 134 that is executable on the CPU(s) 130 to perform tasks of the mobile station 110.

The base station 100 is connected to a serving and/or packet data network (PDN) gateway 112, which terminates the user plane interface toward the enhanced node B and assumes the responsibility for packet routing and transfer towards an external network 114, which can be a packet data network such as the Internet or other type of network.

The arrangement depicted in FIG. 1 is provided for purposes of example. In other implementations, other wireless network arrangements are used.

As noted above, in accordance with some embodiments, incremental reporting of feedback information including CQI and PMI can be performed. In one implementation, the reporting of such feedback information can be in the physical uplink shared channel (PUSCH). However, in other implementations, feedback information can be provided in other types of channels or messages sent from the mobile station to the base station, e.g., the physical uplink control channel (PUCCH). Generally, feedback information is referred to as being sent in a report, where a "report" can include a message, fields of a message, multiple messages, and so forth.

According to some implementations, two modes of operation as defined by the LTE standards can employ the incremental feedback reporting according to preferred embodiments. These two modes of operation include LIE PUSCH reporting Mode 2-0 and Mode 2-2. PUSCH reporting Mode 2-0 as defined by LTE is used for single input, multiple output (SIMO) communication, spatial frequency block coding (SFBC) communication, or open-loop spatial multiplexing (SM) communication. In this reporting mode, the precoding information is not included in the feedback.

Mode 2-2 according to LTE refers to closed loop MIMO (multiple input, multiple output) communication, where closed-loop MIMO uses feedback information to apply coding. For example, based on feedback information (in the form of a PMI) from the mobile station, the base station applies a selected precoding.

Although reference is made to LTE Mode 2-0 and Mode 2-2 in this discussion, it is noted that incremental feedback reporting according to preferred embodiments can also be applied to other types of wireless communications.

Figure 2:
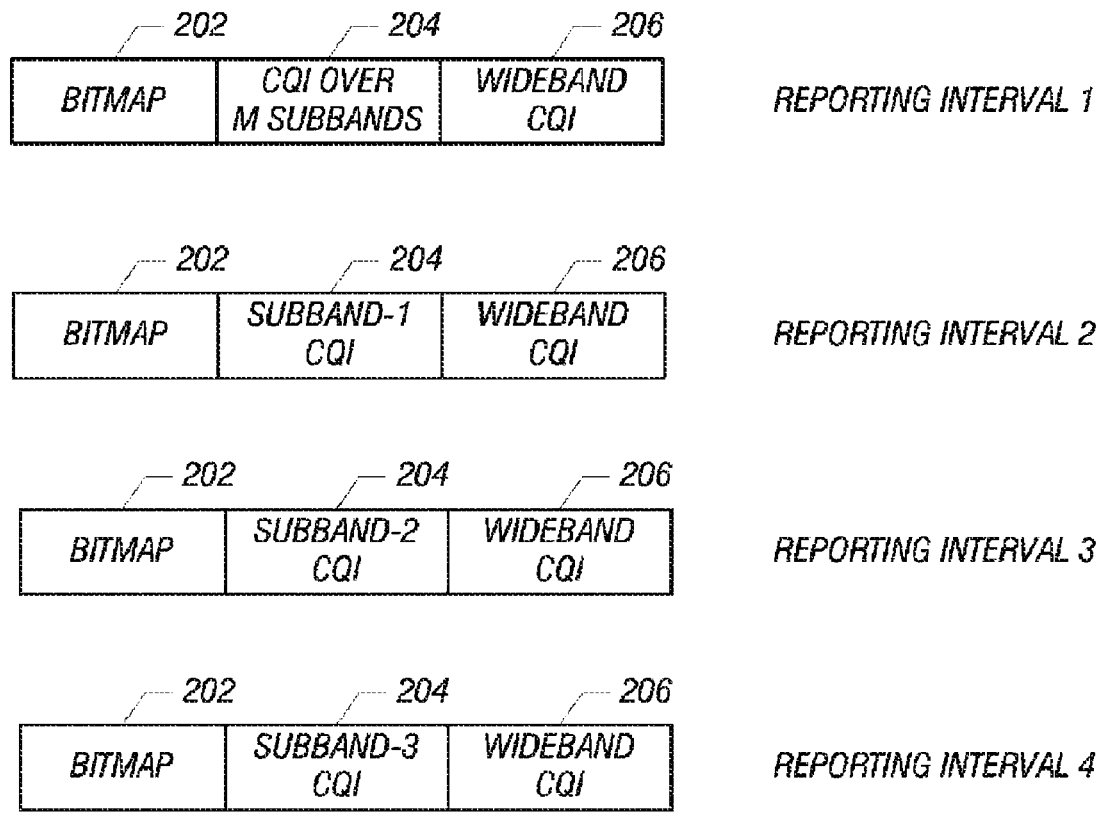
FIGS. 2 and 3 illustrate different reports that can be communicated from a mobile station to a base station to provide feedback information regarding a wireless channel, according to a preferred embodiment.

Incremental reporting of individual CQIs is depicted in FIG. 2 for an enhanced LTE PUSCH reporting Mode 2-0. Four reports are depicted in FIG. 2 for four successive reporting time intervals (1, 2, 3, 4). In one implementation, these four reports are carried by PUSCH from the mobile station to the base station. The report that is sent from the mobile station to the base station includes a bitmap field 202 that contains a bitmap, a subband CQI information field 204 that selectively contains an aggregate CQI or individual CQI, and a wideband CQI information field 206 that contains a wideband CQI. The bitmap identifies the M preferred subbands. The bitmap includes a number of bits that correspond to respective subbands. Setting a respective one of the bits means that a corresponding subband is identified as preferred. In other implementations, other types of data structures can be used to indicate which subbands are preferred.

The subband CQI information field 204 can either include an aggregate CQI for the M subbands identified by the bitmap, or an individual CQI for one of the M subbands. In reporting time interval 1, as shown in FIG. 2, the subband CQI information field 204 contains an aggregate CQI over the M subbands. The wideband CQI information field 206 contains the aggregate CQI over the entire wireless channel including all the subbands.

It is assumed that in reporting interval 1, the predefined condition discussed above is not satisfied, such that the CQI that is communicated in the subband CQI information field 204 is an aggregate CQI over the M subbands. In some embodiments, the predefined condition is based on the content of the bitmap. If the current bitmap is the same as a prior bitmap (in a prior reporting interval), then the predefined condition is satisfied. However, if the current bitmap is different from a prior bitmap in a prior reporting interval, then the predefined condition is not satisfied. The bitmap staying the same in successive reporting intervals is an indication that the mobile station is a slow moving or stationary mobile station.

In the example of FIG. 2, it is assumed that in each of the reporting intervals 2-4, the bitmap remains the same as the bitmap reported in time interval 1. In reporting interval 2, the subband CQI information field 204 includes the individual CQI for a first individual subband from among the M subbands. Similarly, in reporting intervals 3 and 4, the subband CQI information fields 204 of the respective reports contain individual CQIs for corresponding second and third subbands from the M subbands. Thus, when the bitmap does not change, individual CQIs can be reported rather than the aggregate CQI.

Although FIG. 2 shows an implementation in which just one individual CQI for a corresponding individual subband can be included in each report, it is noted that in alternative implementations multiple individual CQIs for corresponding subbands can be included in one report.

Figure 3:
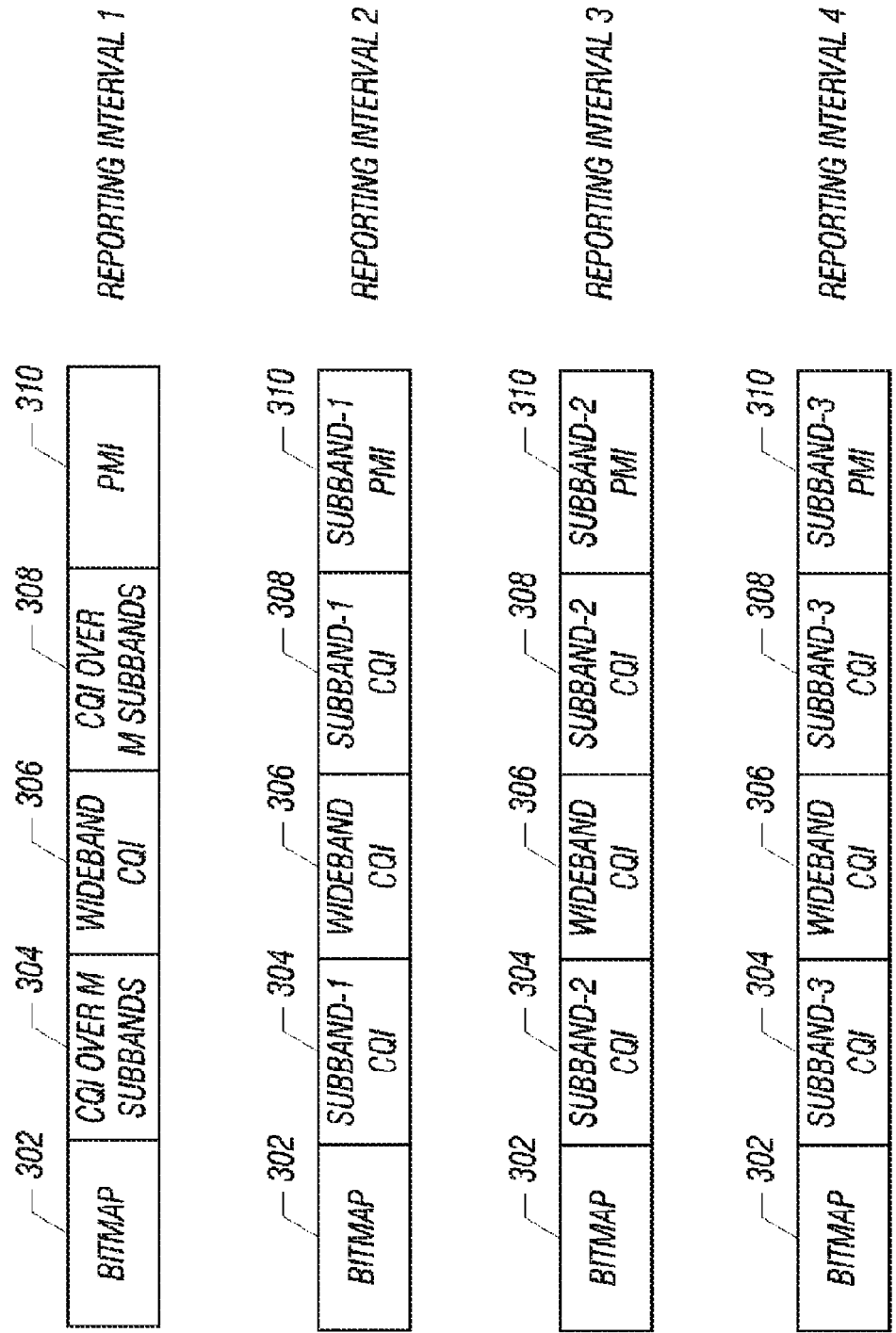

FIG. 3 shows reports sent in four different reporting intervals (1, 2, 3, 4) for on enhanced LTE PUSCH reporting Mode 2-2. Mode 2-2, in addition to CQI information, PMI information is also provided (since closed loop MIMO is used). Moreover, in Mode 2-2, it is assumed that there are two transmitting codewords such that CQI information for the two transmitting codewords are reported separately. In each report shown in FIG. 3, a bitmap field 302 contains the bitmap, a first subband CQI field 304 contains the subband CQI information for a first transmitting codeword, a wideband CQI field 306 contains the wideband CQI, a second subband CQI information field 308 contains the subband CQI information for a second transmitting codeword, and a PMI information field 310 contains PMI information. In the reporting interval 1 of FIG. 3, it is assumed that the current bitmap is different from the prior bitmap (in the prior reporting interval). As a result, the subband CQIs provided in the subband CQI information fields 304 and 308, as well as the PMI information in the PMI information field 310, are aggregate CQIs and PMI, respectively, for the M subbands identified by the bitmap in the field 302.

However, in reporting intervals 2-4, it is assumed that the bitmap stays the same as the bitmap in reporting interval 1, in which case the subband CQI information fields 304 and 308 can include individual CQIs for corresponding transmitting codewords, with different individual CQIs for different subbands reported in successive reporting intervals.

Also, in reporting time intervals 2-4, the PMI information contained in the PMI information field 310 includes the individual PMI for an individual subband, with different individual PMIs reported for corresponding subbands in successive reporting time intervals 2-4.

Figure 4:
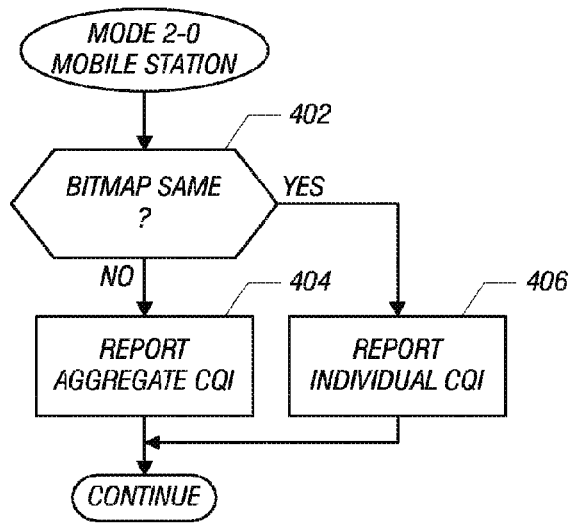
Figure 5:
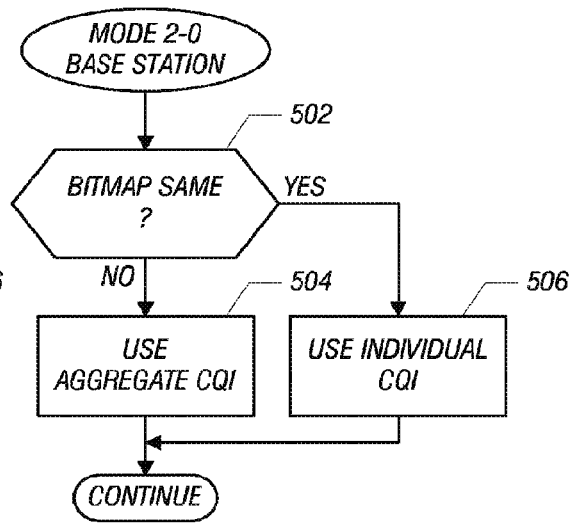

FIGS. 4 and 5 depict operations of a mobile station and base station, respectively, for an enhanced PUSCH reporting Mode 2-0 operation. In a current reporting interval, the mobile station determines (at 402) if the present bitmap is the same as the prior bitmap. If not, the CQI information reported (at 404) in the subband CQI information field 204 (FIG. 2) is the aggregate CQI over the M subbands. However, if the current bitmap is the same as the prior bitmap, then the CQI information reported (at 406) in the subband CQI information field 204 is the individual CQI for corresponding individual subband.

As shown in FIG. 5, the base station determines (at 502) if the present bitmap is the same as the prior bitmap. If not, then the base station uses (at 504) the aggregate CQI that was previously received. However, if the current bitmap is the same as the prior bitmap, then the base station uses (at 506) the individual CQI for a selected subband that is used for transmission of downlink data from the base station to the mobile station.

Figure 6:
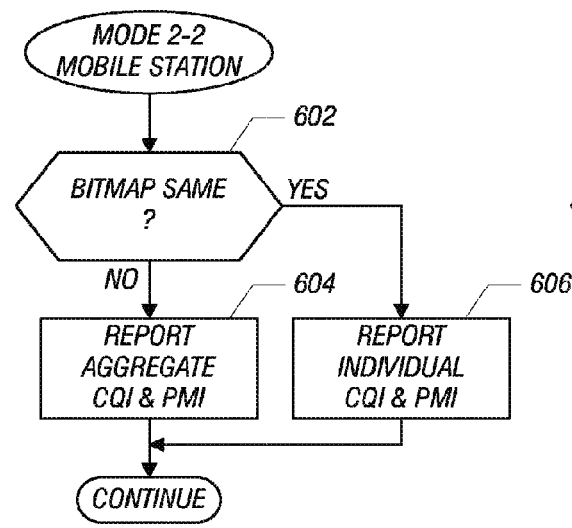
Figure 7:
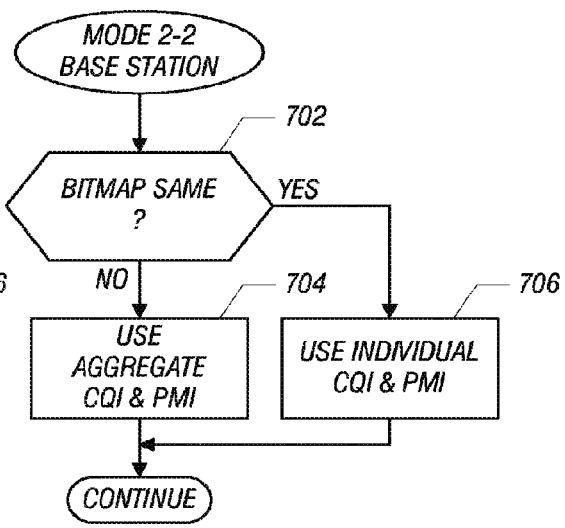

FIGS. 6 and 7 depict the enhanced PUSCH reporting Mode 2-2 operation of the mobile station and base station, respectively. In FIG. 6, the mobile station determines (at 602) if the present bitmap is the same as the prior bitmap. If not, then the subband CQI information fields 304 and 308 and the PMI information field 310 (FIG. 3) of the feedback report are provided (at 604) with aggregate CQI and PMI information for the M subbands. However, if the current bitmap is the same as the prior bitmap, then individual CQIs and an individual PMI are provided (at 606) in corresponding fields 304, 308, and 310 as depicted in time interval 2, 3, or 4 of FIG. 3.

FIG. 7 illustrates the operation of the base station. The base station determines (at 702) if the current bitmap is the same as the prior bitmap. If not, the base station uses (at 704) the aggregate CQIs and aggregate PMI for transmitting downlink information to the mobile station. On the other hand, if the current bitmap is the same as the prior bitmap, then the base station uses (at 706) the corresponding individual CQIs and individual PMI for the selected subband that is used by the base station for communicating data to the mobile station.

In the foregoing discussion, it is assumed that the mobile station makes the decision regarding whether incremental reporting of individual CQIs and/or PMIs for subbands is to be performed. In an alternative embodiment, it is the base station that makes the decision regarding whether or not the mobile station should send individual feedback information for individual subbands.

Figure 8:
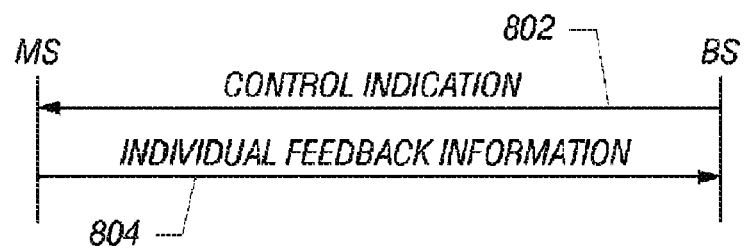
FIGS. 4-8 are flow diagrams of processes of communicating and/or using feedback information regarding a wireless channel, according to preferred embodiments.

For example, as shown in FIG. 8, the base station can decide that the base station wishes to receive individual feedback information about individual subbands from the mobile station. In response to making such a decision, the base station sends (at 802) a control indication to the mobile station. The control indication can be in the form of a higher layer control signaling, such as Radio Resource Control (RRC) signaling, for example. The control indication can be sent in response to the base station determining that a predefined condition is satisfied, such as the bitmap not changing in successive reporting intervals.

In response to the control indication, the mobile station sends (at 804) individual feedback information (individual CQI(s) and/or individual PMI(s)) for individual subband(s) to the base station. The individual feedback information can be communicated in a physical uplink control channel (PUCCH) or other channel.

However, if the base station determines that the predefined condition is not satisfied, then the base station sends another control indication to cause the mobile station to send aggregate feedback information for plural subbands.

The tasks of FIGS. 4-8 can be performed by software in the mobile station 110 or base station 100 of FIG. 1. Instructions of such software are executed on a processor (e.g., CPUs 130 and 122 in FIG. 1). The processor includes microprocessors, microcontrollers, processor modules or subsystems (including one or more microprocessors or microcontrollers), or other control or computing devices. A "processor" can refer to a single component or to plural components (e.g., one or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of reporting feedback information regarding a wireless channel comprising:
determining, by a mobile station, whether preferred subbands of the wireless channel are not changing, wherein said determining whether the preferred subbands of the wireless channel are not changing comprises determining whether a bitmap for a current reporting interval is unchanged from a bitmap for a prior reporting interval, wherein the bitmap identifies the preferred subbands;
in response to determining that the preferred subbands of the wireless channel are not changing:
transmitting in a first report to a base station, feedback information regarding an individual one of plural subbands of the wireless channel; and
receiving, from the base station on the wireless channel, data precoded based on the first report; and
in response to determining that the preferred subbands of the wireless channel are changing:
transmitting in a second report to the base station, aggregate feedback information regarding the plural subbands; and
receiving, from the base station on the wireless channel, data precoded based on the second report.

2. The method of claim 1, wherein the aggregate feedback information includes an average of the plurality of subbands.

3. The method of claim 1, wherein determining if the bitmap identifying preferred subbands has not changed comprises determining if a number of bits that correspond to one or more of the preferred subbands has not changed.

4. The method of claim 1, further comprising:
after sending the first report, including, in a third report to be sent to the base station, further feedback information regarding a second individual one of the plural subbands if the preferred subbands of the wireless channel are not changing.

5. The method of claim 1, further comprising:
including in the first report further feedback information regarding a second individual one of the plural subbands.

6. The method of claim 1, further comprising:
performing, by the mobile station, data communication using one or more of the plural subbands that are less than all available subbands of the wireless channel.

7. The method of claim 1, wherein performing the data communication is according to a closed loop MIMO (multiple input, multiple output) mode of operation.

8. The method of claim 7, wherein the mobile station is to transmit plural codewords, and wherein the feedback information included in the first report is for a first of the plural codewords, and wherein the first report further includes feedback information for an individual subband for another one of the plural codewords.

9. The method of claim 1, wherein the feedback information in the first report for the individual subband comprises at least one of:
a precoding matrix index (PMI); and
channel quality indicator (CQI).

10. A base station comprising:
an interface to communicate wirelessly over a wireless channel with a mobile station; and
a processor configured to:
determine whether preferred subbands of the wireless channel are not changing, wherein to determine whether the preferred subbands of the wireless channel are not changing, the processor is further configured to determine if a bitmap for a current reporting interval is unchanged from a bitmap for a prior reporting interval, wherein the bitmap identifies the preferred subbands;
in response to determining that preferred subbands of the wireless channel are not changing:

using individual feedback information for an individual subband of plural subbands of the wireless channel; and transmitting, on the wireless channel, data precoded based on the individual feedback information; and in response to determining that preferred subbands of the wireless channel are changing:

using aggregate feedback information for the plural subbands; and transmitting, on the wireless channel, data precoded based on the aggregate feedback information.

11. The base station of claim 10, wherein the aggregate feedback information includes an average of the plurality of subbands.

12. The base station of claim 10, wherein the individual feedback information or aggregate feedback information is used for downlink signaling and traffic data to be sent to the mobile station.

13. The base station of claim 10, wherein the individual feedback information comprises at least one of:

an individual channel quality indicator (CQI); and an individual precoding matrix index (PMI).

14. A mobile station comprising:

an interface to communicate wirelessly over a wireless channel with a base station; and a processor configured to:

determine whether preferred subbands of the wireless channel are not changing, wherein to determine whether the preferred subbands of the wireless channel are not changing, the processor is further configured to determine if a bitmap for a current reporting interval is unchanged from a bitmap for a prior reporting interval, wherein the bitmap identifies the preferred subbands;

in response to determining that the preferred subbands of the wireless channel are not changing:

transmit in a first report to a base station, feedback information regarding an individual one of plural subbands of the wireless channel; and receive, from the base station on the wireless channel, data precoded based on the first report; and in response to determining that the preferred subbands of the wireless channel are changing:

transmit in a second report to the base station, aggregate feedback information regarding the plural subbands; and receive, from the base station on the wireless channel, data precoded based on the second report.

15. The mobile station of claim 14, wherein the aggregate feedback information includes an average of the plurality of subbands.

16. The mobile station of claim 14, wherein the first report includes a bitmap identifying the plural subbands as being preferred subbands.

17. The mobile station of claim 14, wherein the individual feedback information includes at least one of:

an individual channel quality indicator (CQI); and an individual precoding matrix index (PMI).

18. The mobile station of claim 14, wherein to determine whether preferred subbands of the wireless channel are not changing the processor is further configured to:

determine whether the bitmap identifying the preferred subbands remains the same in successive reporting intervals.

19. The mobile station of claim 14, wherein to determine whether preferred subbands of the wireless channel are not changing comprises determining if a number of bits that correspond to one or more of the preferred subbands has not changed.

20. The base station of claim 10, wherein determining if the bitmap identifying preferred subbands has not changed comprises determining if a number of bits that correspond to one or more of the preferred subbands has not changed.

* * * * *